Feb. 22, 1949.  J. JOHNSON  2,462,748
PIPE PLUG
Filed April 25, 1945  2 Sheets-Sheet 1
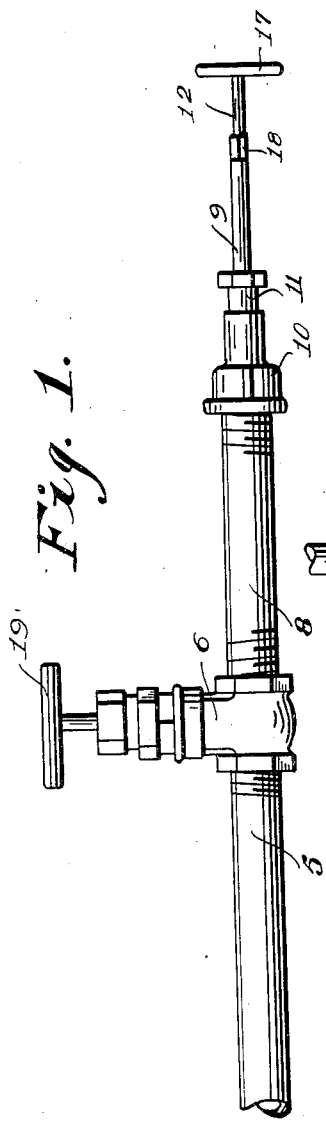
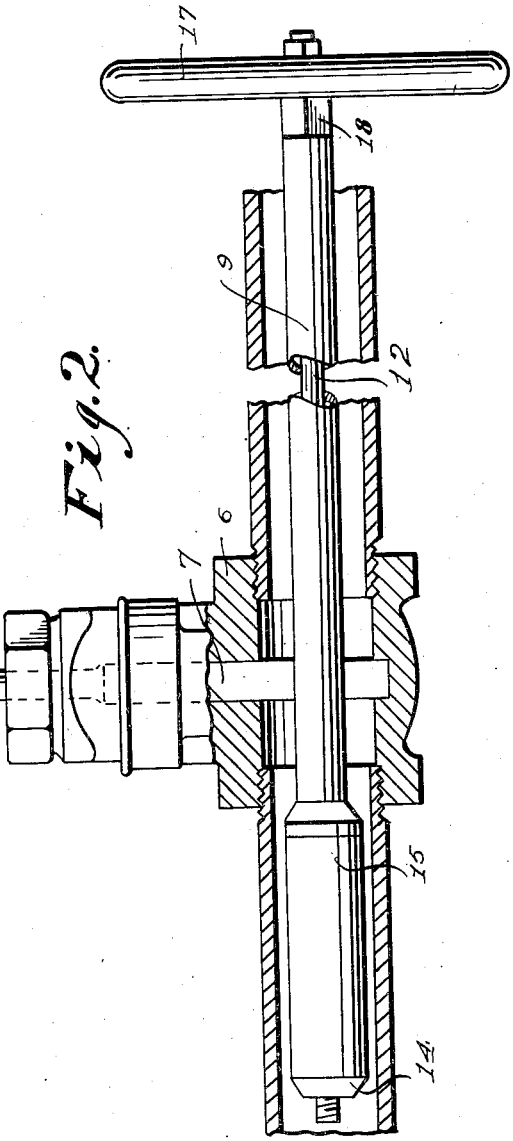
Inventor
John Johnson
By Clarence A. O'Brien
and Harvey B. Jackson
Attorneys Feb. 22, 1949.  J. JOHNSON  2,462,748
PIPE PLUG
Filed April 25, 1945  2 Sheets-Sheet 2
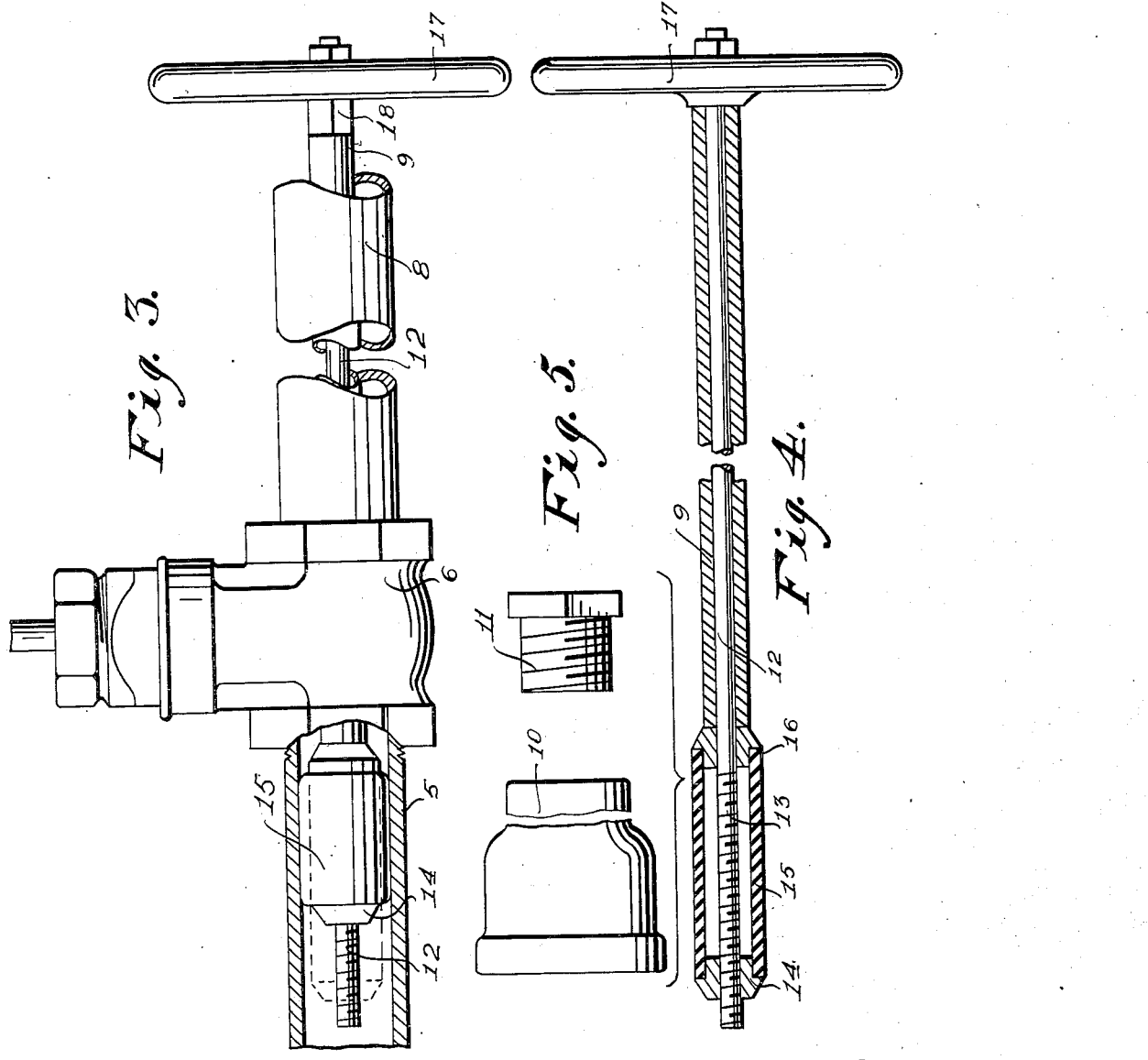
Inventor
John Johnson
By Clarence A. O'Brien
and Harvey B. Jacobson
Attorneys Patented Feb. 22, 1949

2,462,748

UNITED STATES PATENT OFFICE 2,462,748

PIPE PLUG

John Johnson, Grand Forks, N. Dak.

Application April 25, 1945, Serial No. 590,149

1 Claim. (Cl. 138—89)

The present invention relates to a new and useful improvement in plugs for pipes designed primarily for use in closing the pipe while removing, repairing and replacing a valve in the pipe.

An important object of the present invention is to provide an expansible plug adapted for insertion in a pipe in advance of the inlet side of a valve together with means operable from an opposite side of the valve and outwardly thereof for expanding the plug to close the pipe while the valve is being removed.

A further object of the invention is to provide a tool of this character of simple and practical construction which is efficient and reliable in operation, relatively inexpensive to manufacture, easy to assemble and install in operative position and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view showing the plug mounted in position in a pipe.

Figure 2 is an enlarged longitudinal sectional view.

Figure 3 is a similar view showing the plug in expanded position.

Figure 4 is a longitudinal sectional view of the screw and sleeve for expanding the plug, and Figure 5 is a group view in elevation of the packing member for the end of the pipe.

Referring now to the drawings in detail wherein for the purpose of illustration I have disclosed a preferred embodiment of this invention. The numeral 5 designates a pipe section threadedly connected at the intake side of a valve housing 6 for a gate valve 7.

It is customary to attach other pipe sections to the outlet side of the valve housing 6, the valve controlling the passage of fluid through said section.

When it is desired to remove the valve 7 for repair or replacement purposes, a relatively short pipe section 8 is threaded in the outlet side of the valve housing 6 and in the outer end of which a sleeve 9 is inserted and on which is positioned a cap 10 for threading on the outer end of the pipe section 8 and provided with a packing nut 11 to seal the outer end of the pipe section 8.

A rod 12 is slidably inserted in the sleeve 9 and has a screw 13 formed at its inner ends, the screw being threaded through a plug 14 secured in the inner end of an expansible rubber plug 15, preferably of hollow construction, the other end of the plug being seated against a shoulder 16 formed on the inner end of the sleeve 9.

The rod 12 projects outwardly of the sleeve 9 and is formed with a wheel or other manipulating handle 17. The plug 14 and the shoulder 16 space the rubber plug 15 from said rod 12 so that said rubber plug 15 is easily deformable under compression for expansion purpose.

The outer end of the sleeve 9 is formed with a hexagonal or other polygonal form of wrench-gripping surface 18.

In the operation of the device when it is desired to remove the valve 7 from the valve housing 6, the valve is closed and the pipe section 8 attached to the outlet side of the valve housing with the sleeve 9 inserted in the pipe section 8 and the outer end of the pipe section 8 is sealed by the cap 10 and packing plug 11.

The valve 7 is then moved into its open position by the valve handle or wheel 19 and the sleeve 9 carrying the expansible plug 15 and the rod 12 is then moved inwardly through the valve housing 6 beyond the intake end of the valve into the position as shown in Figure 2 of the drawings.

The sleeve 9 is then held stationary by a wrench engaging the flat portion 18 and the screw 13 operated by the wheel 17 to draw the plug 14 in an outward direction to thus expand the plug 15 into the position as shown in Figure 3 of the drawing whereby the pipe 5 is closed and the valve and valve housing 6 may then be moved for repair or replacement purposes.

In order to remove the valve housing 6 it is necessary to remove the pipe section 8, cap 10, plug 11 and wheel 17 from the rod 12 while the plug 15, sleeve 9 and rod 12 remain in the pipe 5.

In view of the foregoing description taken in conjunction with the accompanying drawings it is believed that a clear understanding of the construction, operation and advantages of the device will be quite apparent to those skilled in the art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

I claim:

A pipe plug comprising a rigid sleeve adapted for insertion in one end of a pipe, a packing member on the pipe receiving the sleeve, an expansible rubber sleeve secured at one end to the inner end of the rigid sleeve, a plug secured in the other end of the expansible sleeve, said plug having a threaded bore, a rod slidably inserted in the rigid sleeve and having threaded ends, one end of the rod being threaded in the plug, and means attached to the other end of the rod and adapted to manipulate the same for expanding said rubber sleeve, said sleeve being hollow and spaced by said plug and the inner end of said rigid sleeve from said rod so that said sleeve is easily deformable under compression to expand the same.

JOHN JOHNSON.

REFERENCES CITED

The following references are of record in the file of this patent:

UNITED STATES PATENTS

| Number | Name | Date |
|---|---|---|
| 607,492 | Thomas et al. | July 19, 1898 |
| 986,297 | Kinkade | Mar. 7, 1911 |
| 1,607,428 | Boyd | Nov. 16, 1926 |
| 1,850,040 | Turner | Mar. 15, 1932 |
| 2,299,365 | Valuch | Oct. 20, 1942 |

FOREIGN PATENTS

| Number | Country | Date |
|---|---|---|
| 2,691 | Great Britain | June 8, 1882 |